US009382001B2

(12) United States Patent
Foskey et al.

(10) Patent No.: US 9,382,001 B2
(45) Date of Patent: Jul. 5, 2016

(54) TORQUE TRANSFER SYSTEM FOR A ROTORCRAFT

(71) Applicant: Bell Helicopter Textron Inc., Fort Worth, TX (US)

(72) Inventors: Christopher Foskey, Keller, TX (US); Frank Bradley Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 50 days.

(21) Appl. No.: 14/338,531

(22) Filed: Jul. 23, 2014

(65) Prior Publication Data

US 2016/0023752 A1    Jan. 28, 2016

(51) Int. Cl.
*B64C 27/12* (2006.01)
*F16D 3/18* (2006.01)
*B64C 27/35* (2006.01)
*B64C 27/41* (2006.01)

(52) U.S. Cl.
CPC .............. *B64C 27/12* (2013.01); *B64C 27/35* (2013.01); *B64C 27/41* (2013.01); *F16D 3/185* (2013.01)

(58) Field of Classification Search
CPC ........ B64C 27/12; B64C 27/14; B64C 27/35; B64C 27/37; B64C 27/41
See application file for complete search history.

(56) References Cited

U.S. PATENT DOCUMENTS

| 6,695,254 | B2 * | 2/2004 | Zoppitelli | B64C 27/41 244/17.11 |
| 6,712,313 | B2 * | 3/2004 | Zoppitelli | B64C 27/41 244/17.11 |
| 8,038,539 | B2 * | 10/2011 | Stamps | B64C 27/41 464/138 |
| 8,226,355 | B2 * | 7/2012 | Stamps | B64C 27/32 415/119 |
| 2014/0302938 | A1 * | 10/2014 | Lidak | B64C 27/41 464/125 |

* cited by examiner

*Primary Examiner* — Tien Dinh
*Assistant Examiner* — Richard R Green
(74) *Attorney, Agent, or Firm* — Fish & Richardson P.C.

(57) ABSTRACT

One example of a torque transfer system for a rotorcraft includes a first rotational joint connected to a rotorcraft rotary shaft. The first rotational joint receives a portion of a torque generated by rotation of the rotorcraft rotary shaft and transfers the portion of the torque to a rotorcraft rotating component. The torque transfer system also includes a second rotational joint of a different type connected to the rotorcraft rotary shaft. The second rotational joint receives a remainder of the torque generated by the rotation of the rotorcraft rotary shaft and transfers the remainder of the torque to the rotorcraft rotating component.

20 Claims, 10 Drawing Sheets

TORQUE TRANSFER SYSTEM FOR A ROTORCRAFT

TECHNICAL FIELD

This disclosure relates to torque transfer in rotorcrafts.

BACKGROUND

In some rotorcraft, the rotor blades are coupled to a yoke that is attached to a rotating shaft. Torque generated by the rotating shaft is transferred to the yoke and blades by the coupling between the yoke and the shaft. In some instances, the yoke can be tilted with respect to the shaft during rotation. In some cases, the coupling between the yoke and the shaft can provide constant velocity torque transfer even as the yoke tilts with respect to the shaft.

SUMMARY

This disclosure describes a torque transfer system for a rotorcraft.

Certain aspects of the subject matter described here can be implemented as a torque transfer system for a rotorcraft. The torque transfer system includes a first rotational joint connected to a rotorcraft rotary shaft, the first rotational joint to receive a portion of a torque generated by rotation of the rotorcraft rotary shaft and to transfer the portion of the torque to a rotorcraft rotating component. The torque transfer system also includes a second rotational joint of a different type connected to the rotorcraft rotary shaft, the second rotational joint to receive a remainder of the torque generated by the rotation of the rotorcraft rotary shaft and to transfer the remainder of the torque to the rotorcraft rotating component.

This, and other aspects, can include one or more of the following features. The first rotational joint and the second rotational joint can function in cooperation as a constant velocity joint. The torque transfer system can also include a torque splitter connected to the rotorcraft rotary shaft, the first rotational joint, and the second rotational joint, the torque splitter to split the torque generated by the rotation of the rotorcraft rotary shaft into the portion received by the first rotational joint and the remainder received by the second rotational joint. The second rotational joint can include a trunnion to receive the portion of the torque from the torque splitter. The torque transfer system can also include a first drive link and a second drive link connected to a first end and a second end, respectively, of the trunnion, the first drive link and the second drive link to transfer the portion of the torque to the rotorcraft rotating component. The first drive link can include a first end and a second end, wherein the first end of the first drive link is connected to the first end of the trunnion through a first bearing and the second end of the drive link is connected to the rotorcraft rotating component through a second bearing. The first bearing and the second bearing can be elastomeric bearings. The first rotational joint can be a universal joint. The torque transfer system can also include a gimbal ring to receive the remainder of the torque from the universal joint and transfer the remainder of the torque to the rotorcraft rotating component. The rotorcraft rotating component can be a yoke.

Certain aspects of the subject matter described here can be implemented as a method of transferring torque to a rotorcraft rotating component. The method includes receiving torque generated by rotation of the rotorcraft rotary shaft. The method also includes splitting the received torque into a portion of the torque and a remainder of the torque. The method also includes transmitting the portion of the torque to the rotorcraft rotating component through a first rotational joint, and transmitting the remainder of the torque to the rotorcraft rotating component through a second rotational joint of a different type.

This, and other aspects, can include one or more of the following features. Transmitting the portion of the torque to the rotorcraft rotating component through the first rotational joint can include transmitting the portion of the torque through a universal joint. Transmitting the portion of the torque through the universal joint can include transmitting the portion of the torque through a gimbal ring that connects the universal joint to the rotorcraft rotating component. Transmitting the remainder of the torque to the rotorcraft rotating component through the second rotational joint can include transmitting the remainder of the torque through a trunnion a plurality of drive links.

The plurality of drive links can include a first drive link and a second drive link. Transmitting the remainder of the torque through the second rotational joint can also include transmitting the remainder of the torque from the trunnion to a first drive link and a second drive link connected to a first end of the trunnion and a second end of the trunnion, respectively, and transmitting the remainder of the torque from the first drive link and the second drive link to the rotorcraft rotating component.

The first drive link can include a first end and a second end. The method can also include connecting the first end of the first drive link to the first end of the trunnion through a first bearing and the second end of the drive link to the rotorcraft rotating component through a second bearing. The first bearing and the second bearing can be elastomeric bearings. The rotorcraft rotating component can be a yoke.

Certain aspects of the subject matter described here can be implemented as a torque transfer system for a rotorcraft. The torque transfer system includes a torque splitter connected to a rotorcraft rotary shaft, the torque splitter to receive a torque generated by rotation of the rotorcraft rotary shaft and to split the torque into a first portion and a second portion. The torque transfer system also includes a first rotational joint connected to the torque splitter, the first rotational joint to transfer the first portion of the torque to a rotorcraft rotating component. The torque transfer system also includes a second rotational joint of a different type connected to the torque splitter, the second rotational joint to transfer the second portion of the torque to the rotorcraft rotating component.

This, and other aspects, can include one or more of the following features. The first rotational joint and the second rotational joint can function in cooperation as a constant velocity joint.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a torque transfer system for a rotorcraft. In some rotorcraft, the rotor blades are attached to the arms of a yoke that itself is coupled to the rotating shaft. In some cases, a coupling between the yoke and the shaft transfers torque from the rotating shaft to the yoke when the yoke is tilted with respect to the shaft. One possible coupling for transferring torque in this manner is a universal joint coupling. However, a single universal joint coupling typically does not transfer torque at a constant velocity. In some cases, two universal joints can be used to provide constant velocity torque transfer, but configurations using two universal joints can make inspection or replacement of joint parts difficult or impossible.

This disclosure describes a hybrid dual-path torque transfer system. The torque transfer system includes a coupling that transfers torque from the rotorcraft rotary shaft (e.g., a mast) to a rotorcraft rotating component (e.g., a yoke). The torque transfer system includes a torque splitter coupled to the rotary shaft that transfers torque from the rotary shaft to the rotating component through two separate and different rotational joints. Both rotational joints cooperate to kinematically function as a single constant velocity joint that transfers torque from the rotary shaft to the rotating component. A first rotational joint transfers a portion of the torque to the yoke through a universal joint that can be coupled to the yoke through a gimbal ring. The second rotational joint transfers the rest of the torque to the yoke through a drive trunnion that can be coupled to the yoke through drive links. The drive links can easily be individually removed from the second rotational joint. This allows inspection of the drive links, trunnion, and associated bearings. Exposure of the drive link interface also allows the drive links and bearings to be independently easily replaced without necessitating removal of the entire second rotational joint or other components.

Figure 1:
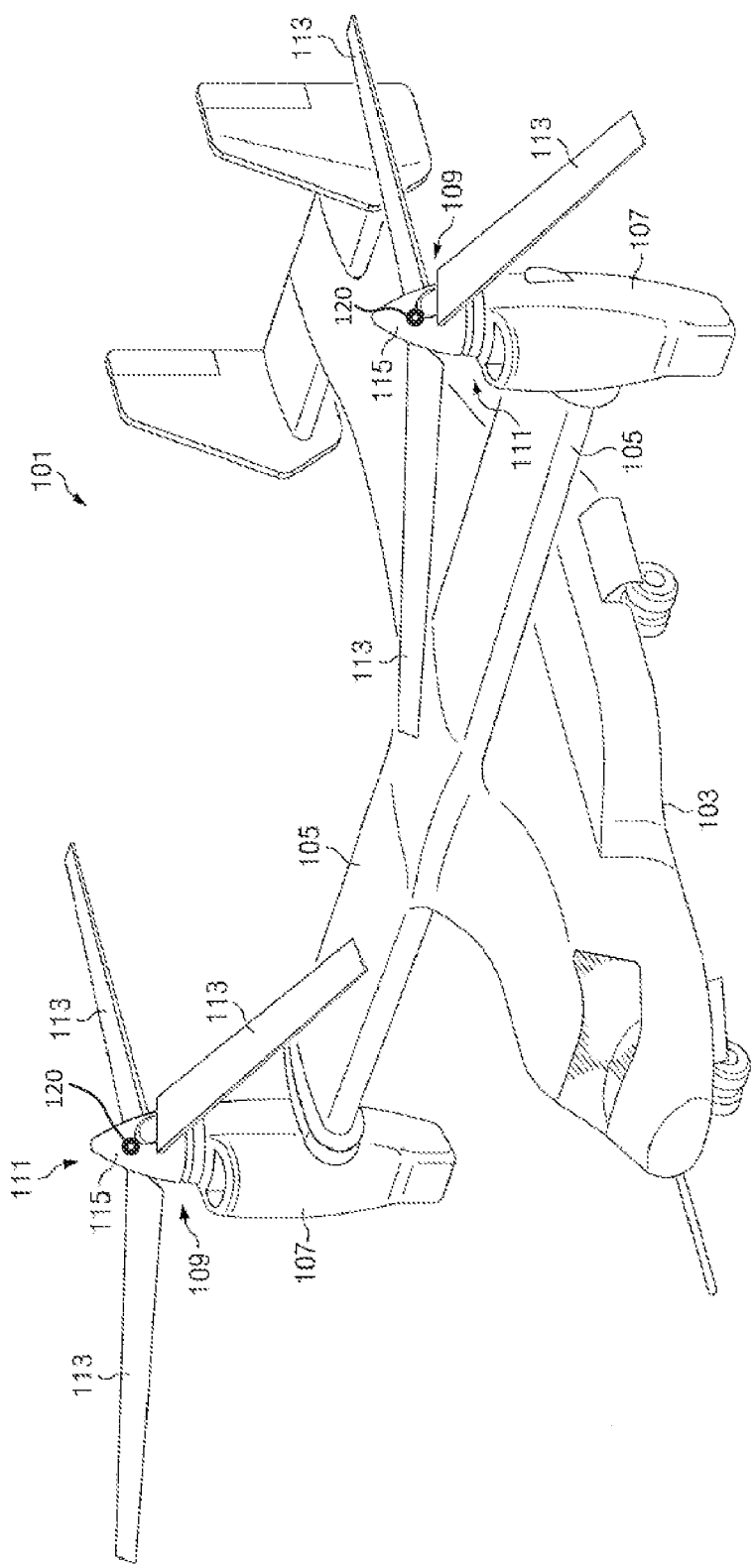
FIG. 1 is a schematic diagram showing an example of a tiltrotor aircraft.

FIG. 1 is a schematic diagram of an example tiltrotor aircraft 101. Aircraft 101 includes a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and transmissions 109 for powering rotor systems 111 in rotation. An engine may be an internal combustion engine, an electrical power source and associated motor, or any other suitable technique for powering rotor system 111. Each rotor system 111 is illustrated as having three blades 113. Spinning covers 115 and nacelles 107 substantially enclose transmission 109, obscuring transmission 109 from view in FIG. 1. The tiltrotor aircraft 101 can include a torque transfer system 406 as part of the coupling between the rotor blades 113 and the transmission 109.

Figure 2:
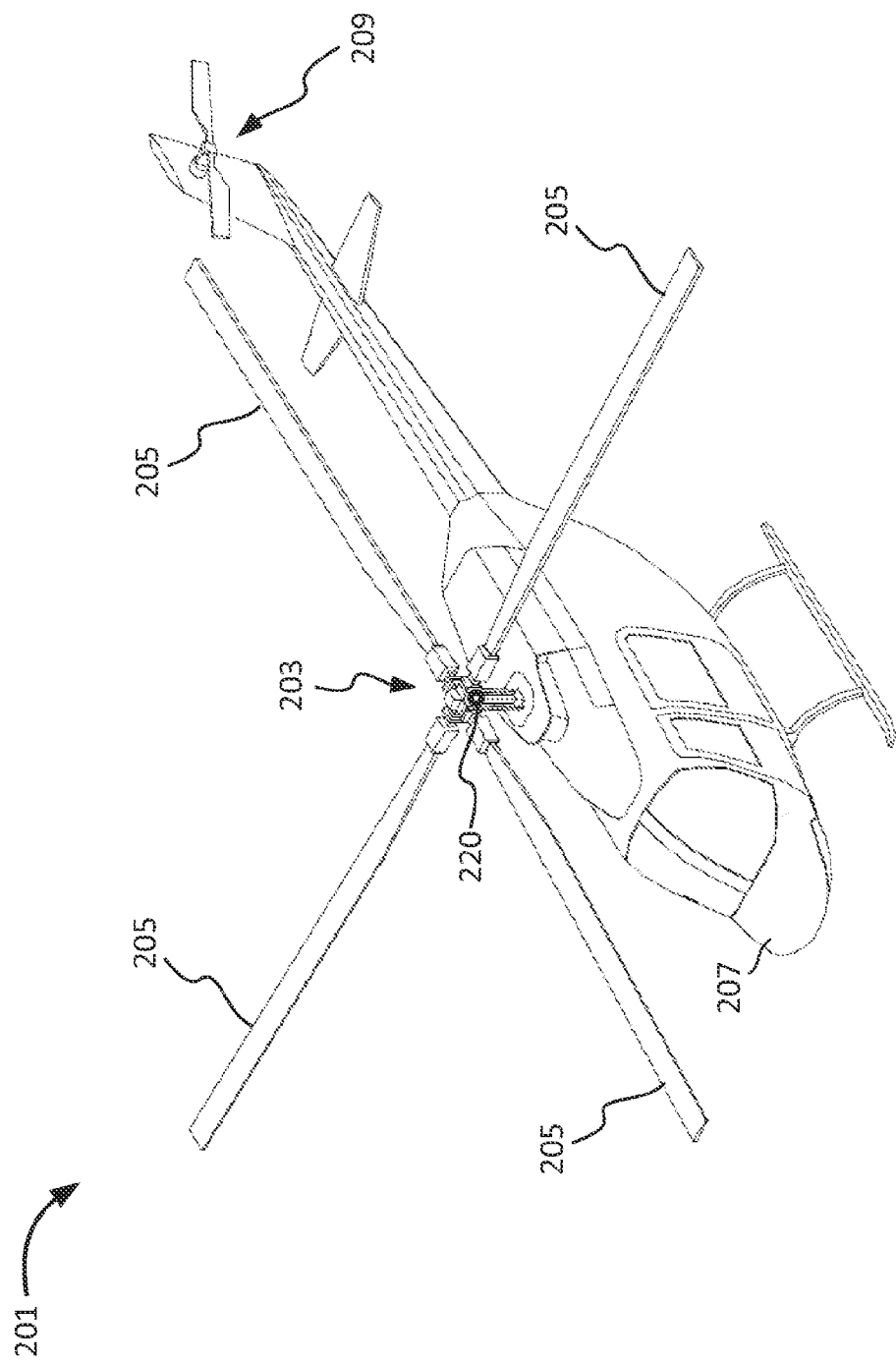
FIG. 2 is a schematic diagram showing an example of a rotorcraft.

FIG. 2 is a schematic diagram of an example rotorcraft 201. Rotorcraft 201 has a rotor system 203 with multiple rotor blades 205. The pitch of each rotor blade 205 can be manipulated in order to selectively control direction, thrust, and lift of rotorcraft 201. Rotorcraft 201 can further include a fuselage 207, anti-torque system 209, and an empennage 211. The rotorcraft 201 can also include a torque transfer system 406. The torque transfer system 406 can be implemented in one or more rotor assemblies of the tiltrotor aircraft 101 or the rotorcraft 201 (or both), as described below.

The torque transfer system described in this disclosure can be implemented in a tiltrotor aircraft such as shown in FIG. 1 or in a rotorcraft such as shown in FIG. 2. The torque transfer system can be used in any driven non-rigid rotor system in an aircraft, tiltrotor, or rotorcraft. Furthermore, the torque transfer system can be implemented in any system in which torque needs to be transferred from a rotational shaft to components that rotate responsive to the torque. For example, the torque transfer system could be implemented in automotive systems (e.g. automobiles, ATVs, motorcycles, or other automotive systems), fixed-wing aircraft, submersible systems, marine systems (e.g. personal watercraft, boats, or other marine systems), agricultural systems (e.g. tractors or other agricultural systems), power equipment (e.g. generators, lawn mowers, or other power equipment), or other systems.

Figure 3:
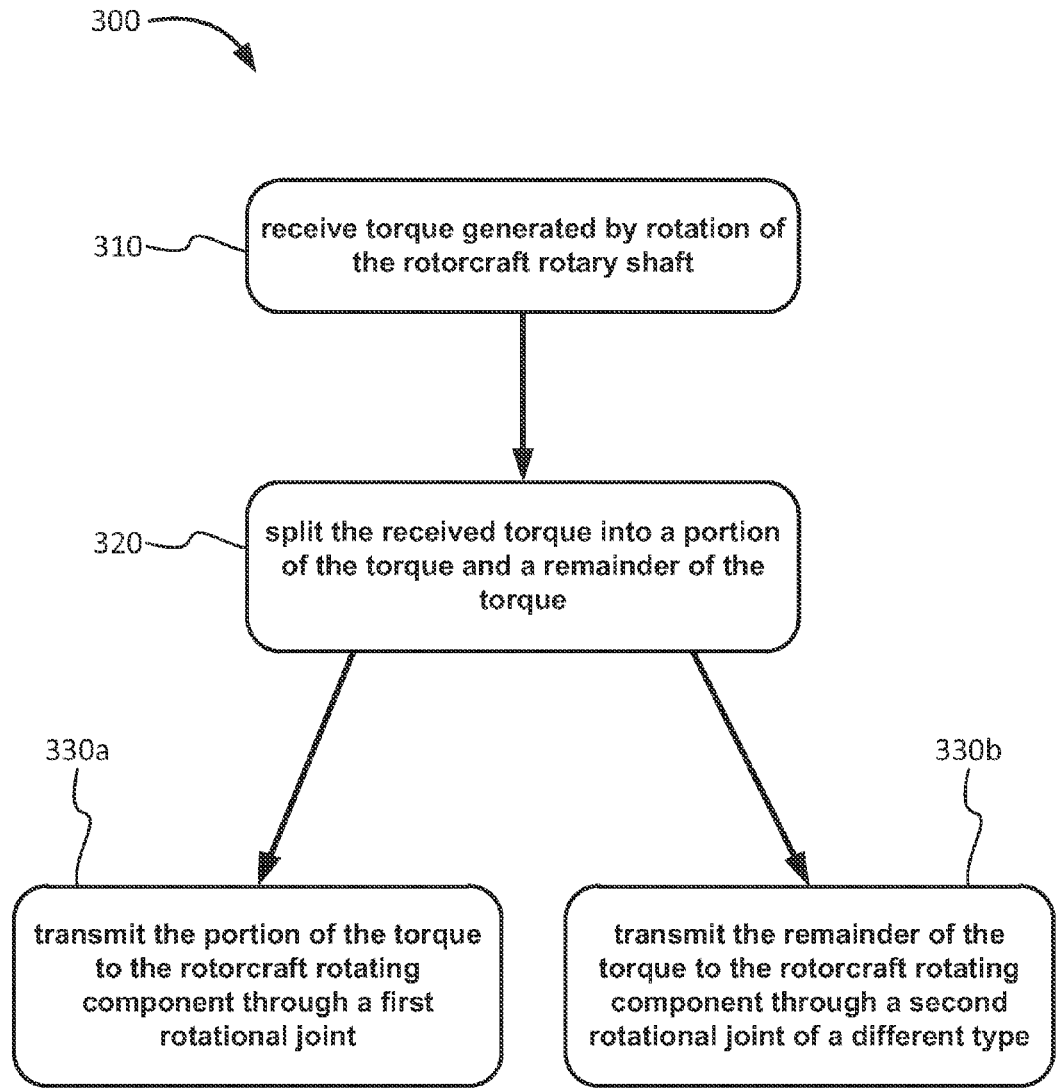
FIG. 3 is a flowchart showing an example process for transferring torque in a rotorcraft rotor assembly.

FIG. 3 is a flowchart of an example torque transfer process 300. For example, the torque transfer process 300 can be implemented by a first rotational joint and a second rotational joint of a different type connected to a rotorcraft rotary shaft. The first rotational joint receives a portion of a torque generated by rotation of the rotorcraft rotary shaft and transfers the portion of the torque to a rotorcraft rotating component. The second rotational joint receives the remainder of the torque generated by the rotation of the rotorcraft rotary shaft and transfers the remainder of the torque to the rotorcraft rotating component. The first and second rotational joints operate together as a constant velocity joint to transfer torque from the rotary shaft to the rotating component. The torque transfer process 300 can be implemented in a rotorcraft or other system as described previously.

Figure 4A:
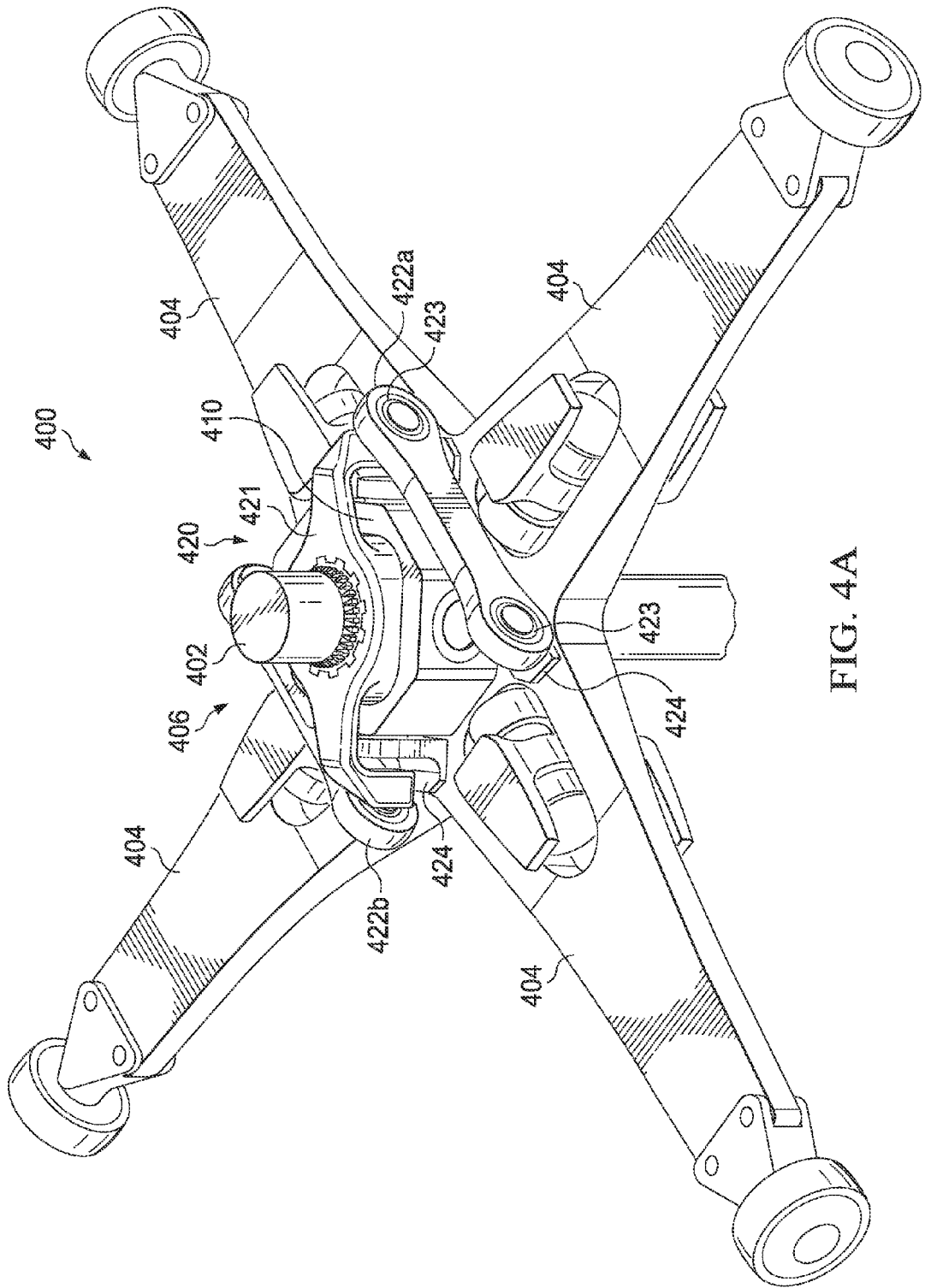
FIG. 4A is a schematic diagram showing an example of a rotor assembly including a torque transfer system.
Figure 4B:
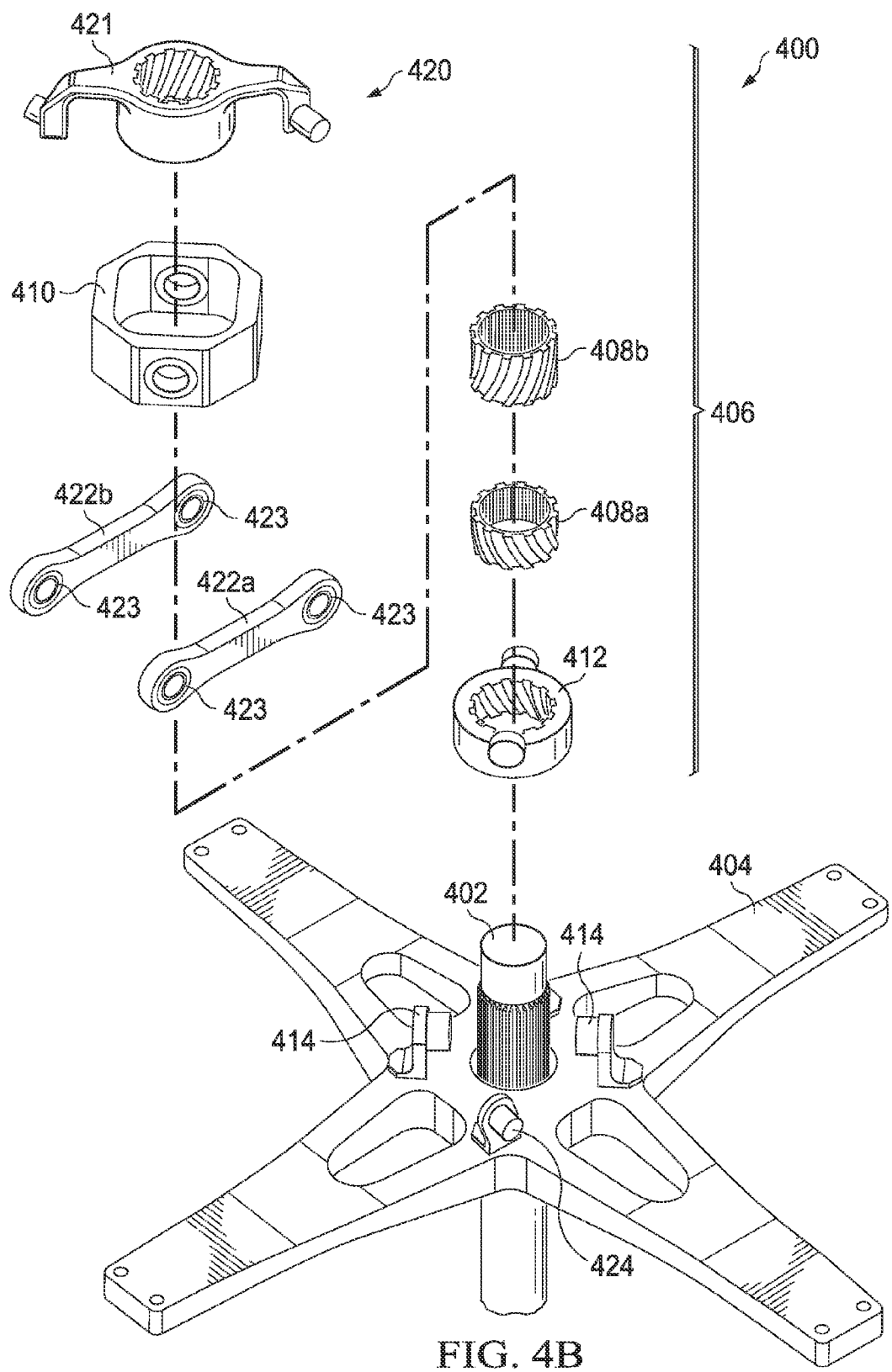
FIG. 4B is a partially exploded schematic diagram showing the example rotor assembly including a torque transfer system.
Figure 4C:
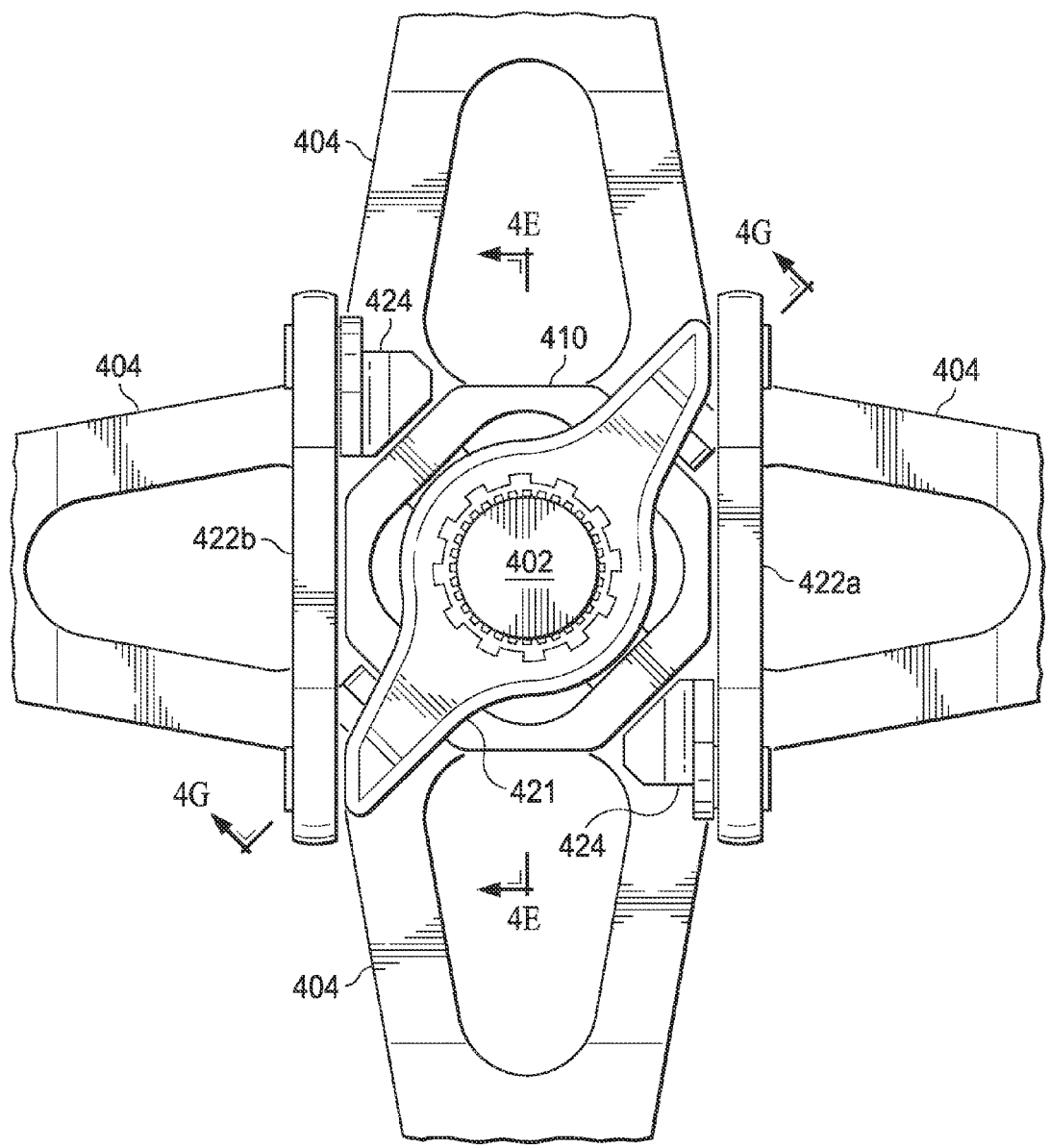
FIG. 4C is a schematic diagram showing a top-down view of the example rotor assembly including a torque transfer system.
Figure 4D:
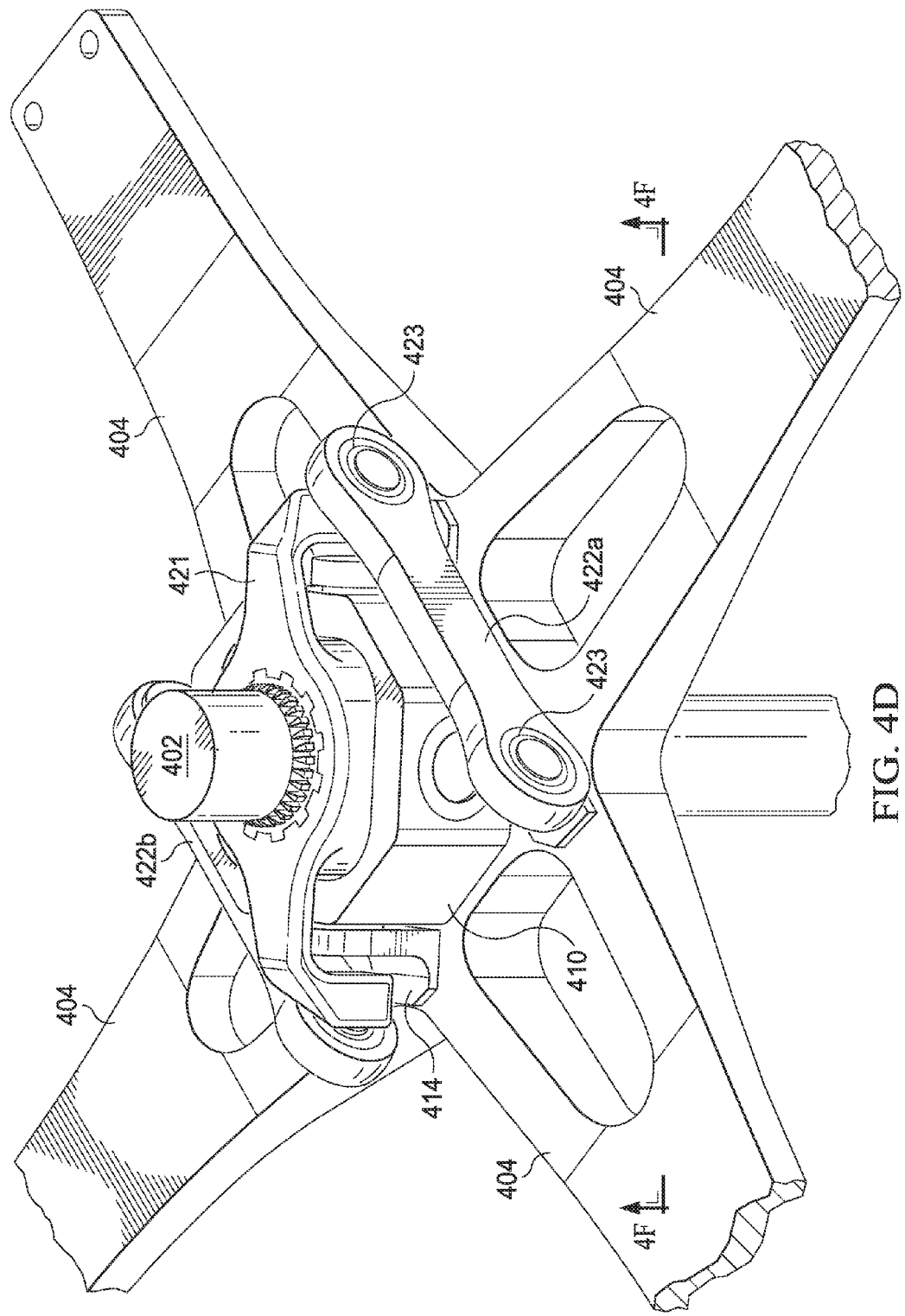
FIG. 4D is a schematic diagram showing a perspective view of the example rotor assembly including a torque transfer system.
Figure 4E:
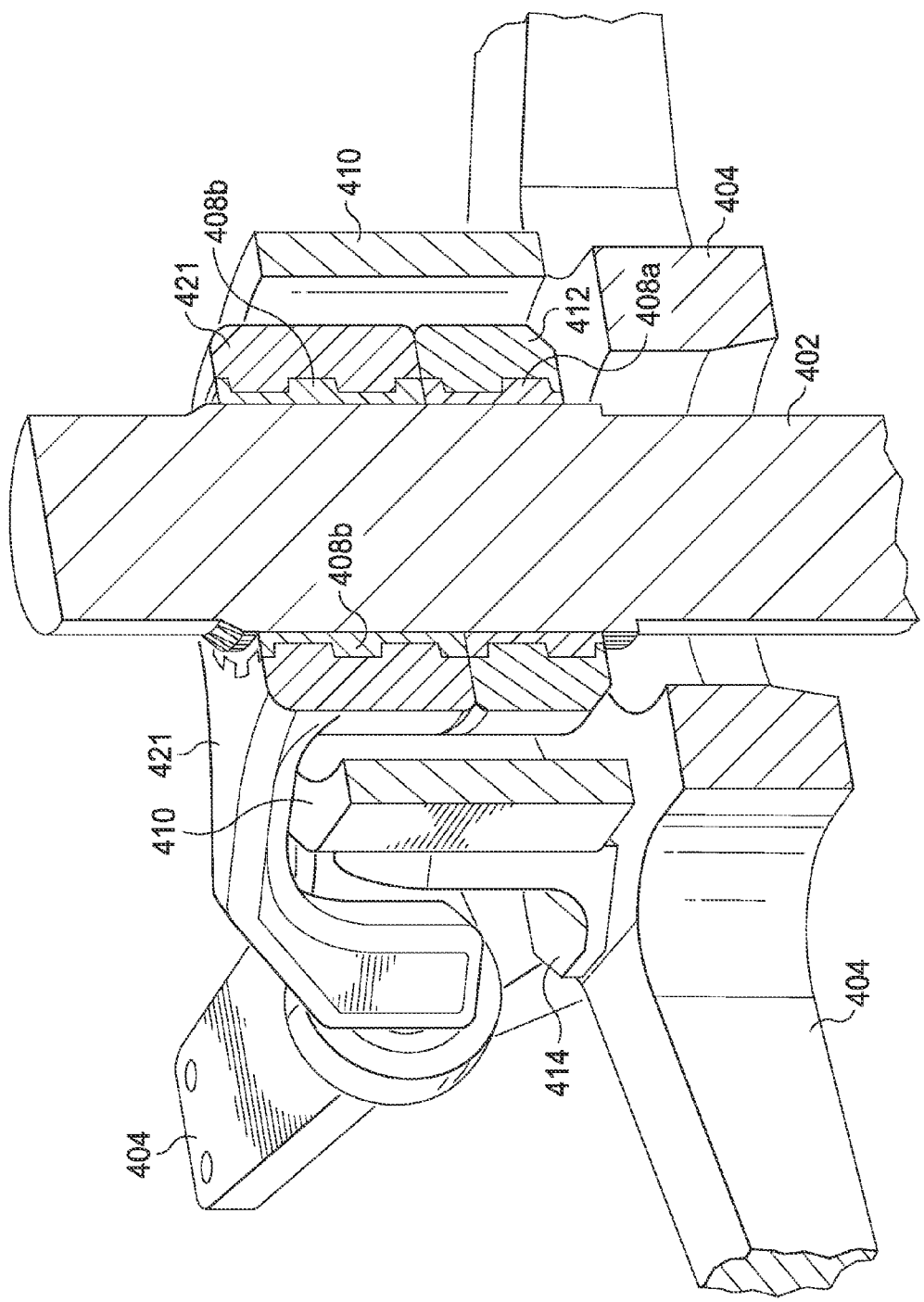
FIGS. 4E-4G are schematic diagrams showing cross-sectional views of the example rotor assembly including a torque transfer system.
Figure 4F:
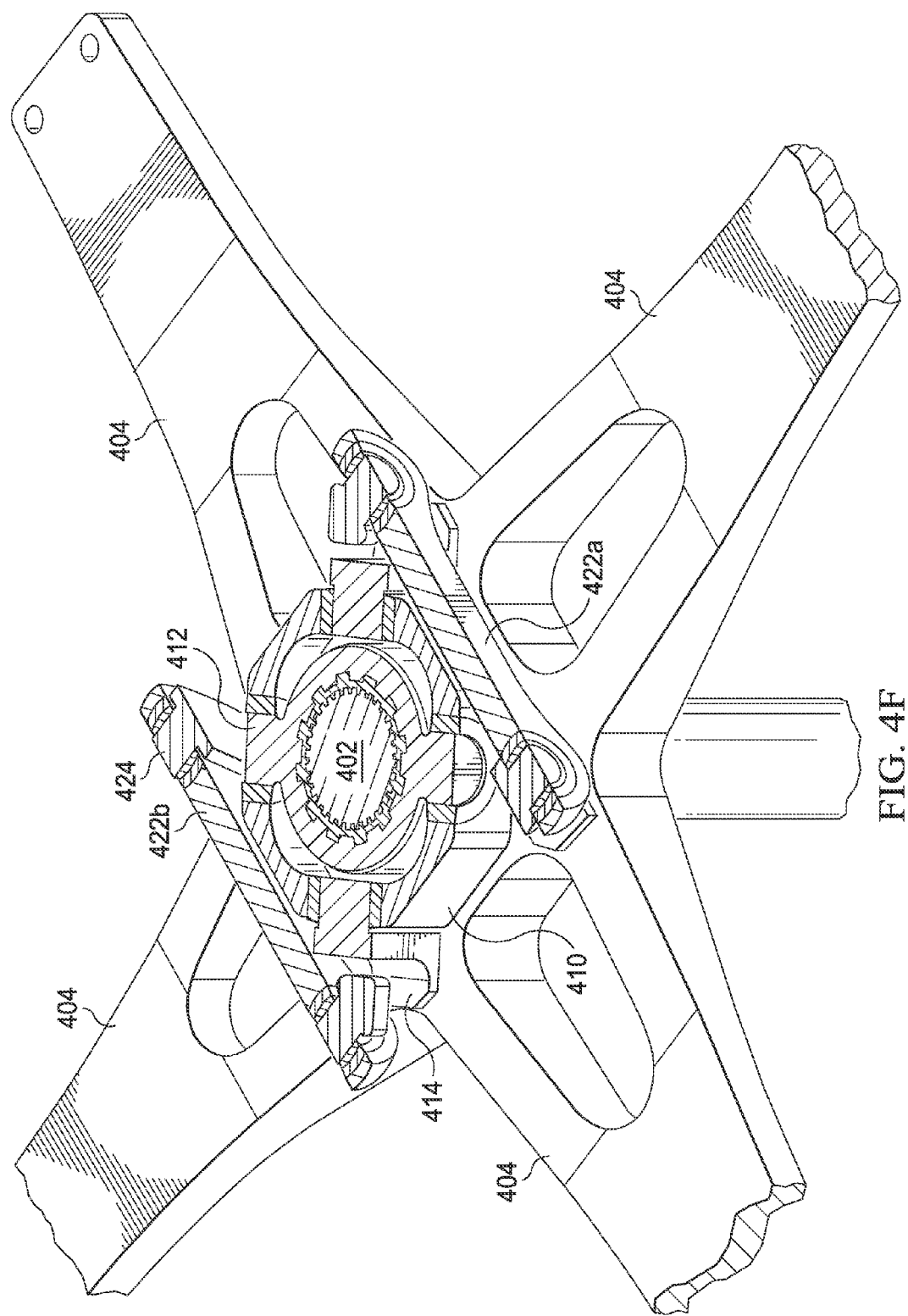
Figure 4G:
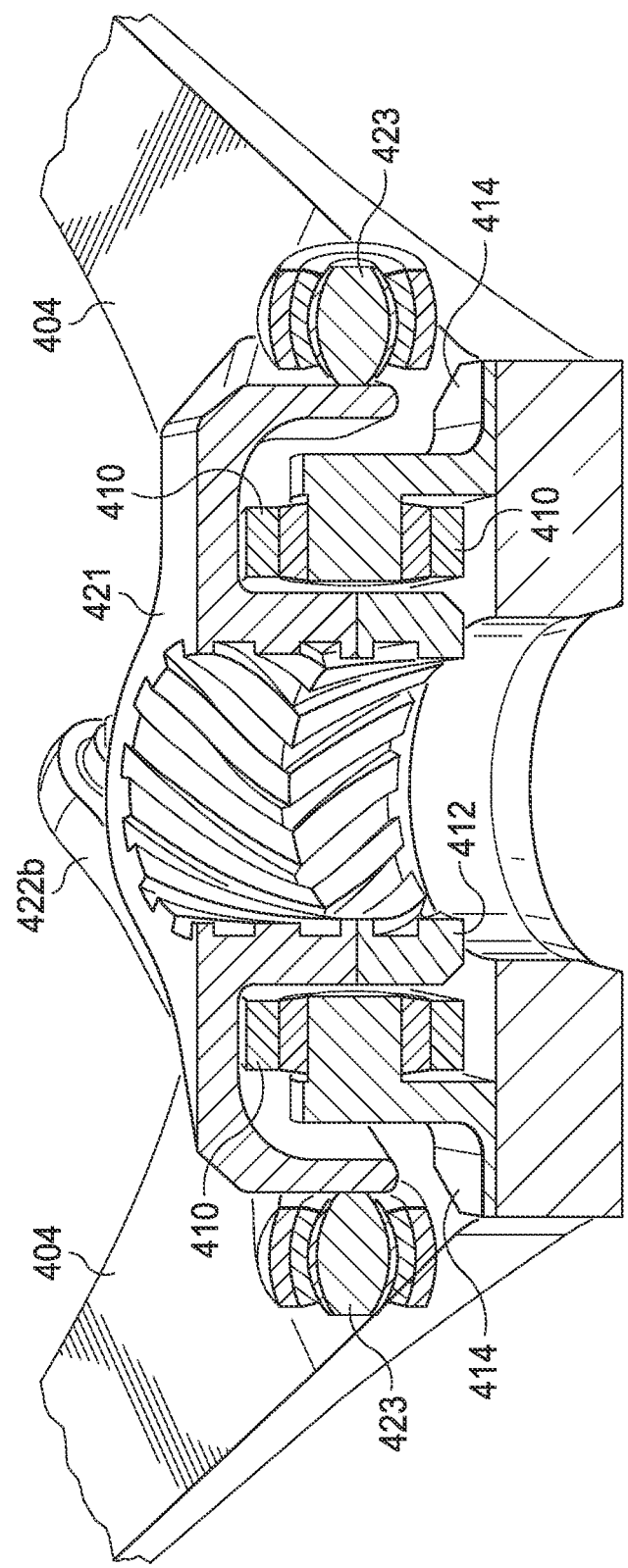

FIGS. 4A-4G are schematic diagrams of an example rotor assembly 400 which can implement the torque transfer process 300. Specifically, FIG. 4B is a partially exploded schematic diagram of the example rotor assembly 400, and FIGS. 4E-4G are cross-sectional views of the example rotor assembly 400. The rotor assembly 400 can be included in the rotor systems 111 described in FIG. 1 or in the rotor system 203 described in FIG. 2. The rotor assembly 400 includes a rotorcraft rotary shaft 402, e.g., a mast, and an example rotorcraft rotating component, e.g., a yoke 404. Example yoke 404 includes multiple arms extending radially outward from a central portion of yoke 404. Example yoke 404 has four arms, but in other implementations yoke 404 can include more or fewer arms. Each arm connects a blade assembly (not shown) to yoke 404 for rotation with yoke 404. Each blade assembly includes a blade (not shown) that attaches to a blade grip (not shown). In other implementations, the rotary shaft 402 can be a rotary shaft other than a mast, and the rotorcraft rotating component can be a component other than a yoke, such as a rotor hub. The rotor assembly 400 also includes a torque transfer system 406 that pivotally attaches yoke 404 to rotary shaft 402 and transfers torque from the rotary shaft 402 to the yoke 404 while allowing yoke 404 to rotate about axes relative to the rotary shaft 402.

At 310, torque generated by rotation of the rotorcraft rotary shaft is received. The torque can be received, for example, by a rotorcraft component connected to the rotary shaft. In example rotor assembly 400, the torque is received from rotary shaft 402 by the torque transfer system 406.

At 320, the received torque is split into a portion of the torque and a remainder of the torque, as described below. The torque can be split by a rotorcraft component such as a torque splitter. In example rotor assembly 400, the torque transfer system 406 includes a torque splitter 408 which is coupled to the rotary shaft 402. The torque splitter 408 divides the torque received from the rotary shaft 402 into a portion of the torque and a remainder of the torque.

At 330a, the portion of the torque is transferred to the rotating component through a first path. For example, the first rotational joint could be implemented as a universal joint. Transmitting the portion of the torque through the first path could also include transmitting the portion of the torque through a gimbal ring that connects a universal joint to the rotating component.

Transferring the torque through the first path can be implemented by the example first rotational joint 412 shown in FIGS. 4A-4G. The example first rotational joint 412 is coupled to the torque splitter 408 to receive the portion of the torque. The example first rotational joint 412 is a universal joint that is pivotably coupled to a gimbal ring 410. In some implementations, the first rotational joint 412 is located in the interior of the gimbal ring 410. The gimbal ring 410 is also pivotably coupled to the yoke 404 via a set of first grounding points 414 that are affixed to the yoke 404. In this manner, the example first rotational joint 412 transmits the portion of the torque to the yoke 404 through the gimbal ring 410.

At 330b, the remainder of the torque is transmitted to the rotating component through a second path. For example, transmitting the remainder of the torque through the second path could include transmitting the remainder of the torque through a second rotational joint implemented partly as a drive trunnion. Transmitting the portion of the torque through the second path could also include transmitting the portion of the torque through drive links that connect a trunnion to the rotating component. In this manner, the trunnion can act as a drive link interface between the rotary shaft and the rotating component.

Transferring the torque through a second path can be implemented by the example second rotational joint 420 shown in FIGS. 4A-4G. The example second rotational joint 420 is coupled to the torque splitter 408 to receive the remainder of the torque. The example second rotational joint 420 includes a trunnion 421 that is coupled to the yoke 404 by two drive links 422. The first drive link 422a and the second drive link 422b are connected to a first end and a second end, respectively, of the trunnion 421. Each drive link 422 also includes a first end and a second end, and the first end of each drive link 422 is pivotably connected to an end of the trunnion 421 through a first bearing 423. The second end of each drive link 422 is pivotably connected to the rotorcraft rotating component 404 through a second bearing 423 coupled to a grounding point 424 that is affixed to the yoke 404. In this manner, the remainder of the torque received by the trunnion 421 is transmitted through the drive links 422 to the yoke 404.

There are bearings at all junctions where components are pivotably connected or where rotational force is transferred (e.g., bearings 423). The bearings can be elastomeric bearings which provide some compliance in the system. For example, the elastomeric bearings can also absorb some unwanted oscillatory or shear forces. The bearings can be spherical, conical, cylindrical, or another shape.

By adjusting the sizes and lengths of components (e.g. the drive links 422) or the properties of the elastomeric bearings (e.g. size, stiffness, shape), the torque transfer system 406 can be adapted for different situations or for different applications.

As described above, the received torque is split into a portion of the torque and a remainder of the torque at 320. To do so, the example torque transfer system 406 includes an example torque splitter 408. The torque splitter 408 is coupled to the rotary shaft 402 to receive torque generated by the rotating rotary shaft 402. For example, the rotary shaft 402 can be splined (e.g. axially, helically, etc.) and the surface of the axial bore of torque splitter 408 can be adapted to receive the splined rotary shaft 402. The torque splitter 408 is also coupled to the first rotational joint 412 and the second rotational joint 420. The torque splitter 408 splits the torque into a first portion and a second portion, and transmits the portions to the first rotational joint 412 and the second rotational joint 420, respectively.

The example torque splitter 408 includes a lower helical drive ring 408a and an upper helical drive ring 408b. The helical drive rings 408a, 408b include splined inner surfaces to receive the rotary shaft 402. The helical drive rings 408a, 408b can also feature outer splines oriented in different directions. For example, helical drive ring 408a can feature an outer helical spline oriented at a first direction, and helical drive ring 408b can feature an outer helical spline oriented at a second direction different from the first direction (e.g., opposite of the first direction). The inner surfaces of the universal joint 412 and trunnion 421 are splined so as to receive the lower helical drive ring 408a and upper helical drive ring 408b, respectively. In this manner, torque is transferred from the helical drive rings 408a, 408b to the joints 412, 420.

In some implementation, the helical drive rings 408a, 408b also include one or more bearings or inner splined members. For example, bearings or inner splined members can be located between the rotary shaft 402 and the helical drive rings 408a, 408b, or be located between the helical drive rings 408a, 408b and the universal joint 412 or trunnion 421. In this manner, the bearings or inner splined members can transfer torque to or receive torque from the helical drive rings 408a, 408b. In some implementations, the inner splined members are configured to allow the helical drive rings 408a, 408b to move axially. The helical drive rings 408a, 408b, the bearings, and the inner splined members can be a material such as an elastomeric material, a metal, or another material.

The opposite helical elastomeric outer splines of helical drive rings 408a, 408b can split torque between the two rotational joints 412 and 420. In some embodiments, the torque splitter 408 may allow rotational joints 412 and 420 to scissor relative to each other by allowing helical drive rings 408a, 408b to move axially in a direction that allows joints 412 and 420 to scissor on opposing helical splines. This scissoring motion can eliminate some kinematic binding forces.

A torque splitter can be implemented such as the torque splitter disclosed in pending application Ser. No. 13/975,830, filed on Aug. 26, 2013, which is hereby incorporated by reference in its entirety. Additional torque splitter configurations can be implemented without departing from the spirit and scope of the disclosure, such as the torque splitters disclosed in U.S. Pat. No. 6,695,254 and U.S. Pat. No. 6,712,313.

A number of implementations have been described. Nevertheless, it will be understood that various modifications may be made without departing from the spirit and scope of the disclosure.

What is claimed is:

1. A torque transfer system for a rotorcraft, the system comprising:
   a first rotational joint connected to a rotorcraft rotary shaft, the first rotational joint to receive a portion of a torque generated by rotation of the rotorcraft rotary shaft and to transfer the portion of the torque to a rotorcraft rotating component; and
   a second rotational joint separate from and transferring torque using a different mechanism than the first rotational joint, wherein the second rotational joint is connected to the rotorcraft rotary shaft, the second rotational joint to receive a remainder of the torque generated by the rotation of the rotorcraft rotary shaft and to transfer the remainder of the torque to the rotorcraft rotating component.

2. The system of claim 1, wherein the first rotational joint and the second rotational joint function in cooperation as a constant velocity joint.

3. The system of claim 1, further comprising a torque splitter connected to the rotorcraft rotary shaft, the first rotational joint, and the second rotational joint, the torque splitter to split the torque generated by the rotation of the rotorcraft rotary shaft into the portion received by the first rotational joint and the remainder received by the second rotational joint.

4. The system of claim 3, wherein the second rotational joint comprises a trunnion to receive the remainder of the torque from the torque splitter.

5. The system of claim 4, further comprising a first drive link and a second drive link connected to a first end and a second end, respectively, of the trunnion, the first drive link and the second drive link to transfer the remainder of the torque to the rotorcraft rotating component.

6. The system of claim 5, wherein the first drive link includes a first end and a second end, wherein the first end of the first drive link is connected to the first end of the trunnion through a first bearing and the second end of the drive link is connected to the rotorcraft rotating component through a second bearing.

7. The system of claim 6, wherein the first bearing and the second bearing are elastomeric bearings.

8. The system of claim 1, wherein the first rotational joint comprises a universal joint to receive the portion of the torque.

9. The system of claim 8, further comprising a gimbal ring pivotably coupled to the universal joint and the rotorcraft rotating component, the gimbal ring to receive the portion of the torque from the universal joint and transfer the portion of the torque to the rotorcraft rotating component.

10. The system of claim 1, wherein the rotorcraft rotating component is a yoke.

11. A method of transferring torque to a rotorcraft rotating component, the method comprising:
    receiving torque generated by rotation of a rotorcraft rotary shaft;
    splitting the received torque into a portion of the torque and a remainder of the torque;
    transmitting the portion of the torque to the rotorcraft rotating component through a first rotational joint; and
    transmitting the remainder of the torque to the rotorcraft rotating component through a second rotational joint separate from and transferring torque using a different mechanism than the first rotational joint.

12. The method of claim 11, wherein transmitting the portion of the torque to the rotorcraft rotating component through the first rotational joint comprises transmitting the portion of the torque through a universal joint.

13. The method of claim 12, wherein transmitting the portion of the torque through the universal joint comprises transmitting the portion of the torque through a gimbal ring that connects the universal joint to the rotorcraft rotating component.

14. The method of claim 11, wherein transmitting the remainder of the torque to the rotorcraft rotating component through the second rotational joint comprises transmitting the remainder of the torque through a trunnion and a plurality of drive links.

15. The method of claim 14, wherein the plurality of drive links comprise a first drive link and a second drive link, and wherein transmitting the remainder of the torque through the second rotational joint further comprises:
    transmitting the remainder of the torque from the trunnion to the first drive link and the second drive link connected to a first end of the trunnion and a second end of the trunnion, respectively; and
    transmitting the remainder of the torque from the first drive link and the second drive link to the rotorcraft rotating component.

16. The method of claim 15, wherein the first drive link includes a first end and a second end, and wherein the method further comprises connecting the first end of the first drive link to the first end of the trunnion through a first bearing and the second end of the drive link to the rotorcraft rotating component through a second bearing.

17. The method of claim 16, wherein the first bearing and the second bearing are elastomeric bearings.

18. The method of claim 11, wherein the rotorcraft rotating component is a yoke.

19. A torque transfer system for a rotorcraft, the system comprising:
    a torque splitter connected to a rotorcraft rotary shaft, the torque splitter to receive a torque generated by rotation of the rotorcraft rotary shaft and to split the torque into a first portion and a second portion;
    a first rotational joint connected to the torque splitter, the first rotational joint comprising a universal joint and configured to transfer the first portion of the torque to a rotorcraft rotating component; and
    a second rotational joint separate from and having a different structure than the first rotational joint, the second rotational joint comprising a trunnion connected to the torque splitter and a drive link pivotably connected to the trunnion at a first end of the drive link and pivotably connected to the rotorcraft rotating component at a second end of the drive link, the second rotational joint to transfer the second portion of the torque to the rotorcraft rotating component.

20. The system of claim 19, wherein the first rotational joint and the second rotational joint function in cooperation as a constant velocity joint.

* * * * *